J. F. McCANNA.
LINK AND LEVER CONNECTION.
APPLICATION FILED JUNE 20, 1912.
1,102,776.
Patented July 7, 1914.
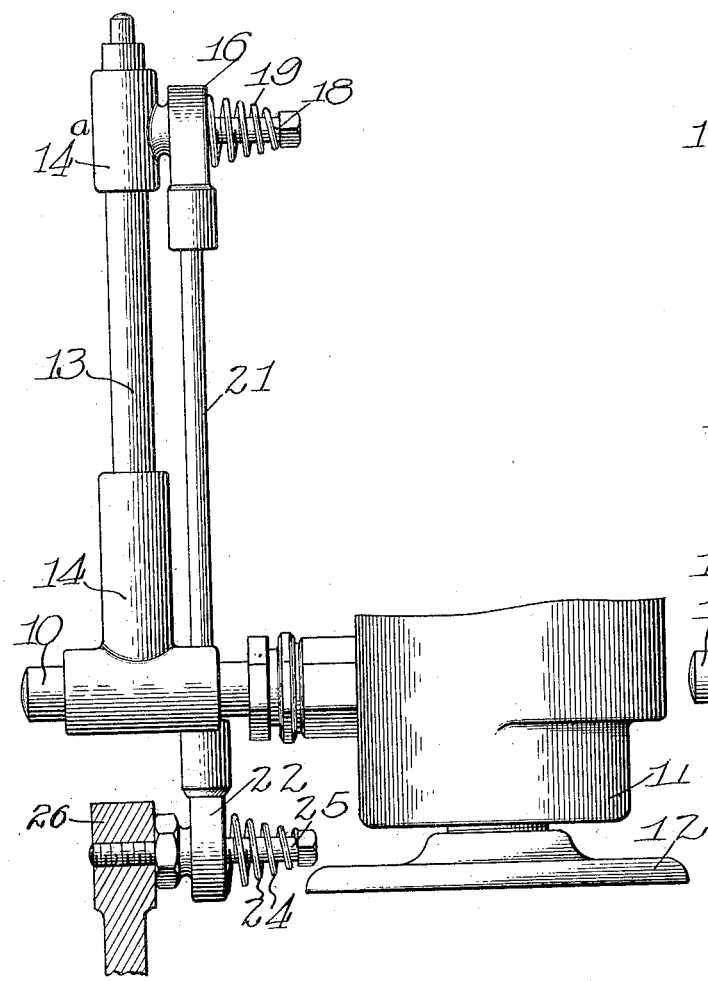
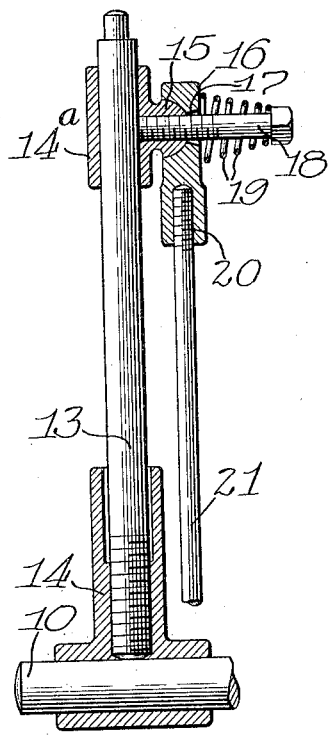
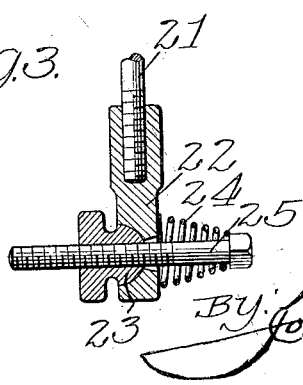

UNITED STATES PATENT OFFICE.

JOHN F. McCANNA, OF CHICAGO, ILLINOIS, ASSIGNOR TO IMPERIAL BRASS MANUFACTURING COMPANY, OF CHICAGO, ILLINOIS, A CORPORATION OF ILLINOIS.

LINK-AND-LEVER CONNECTION.

1,102,776.          Specification of Letters Patent.        Patented July 7, 1914.

Original application filed April 20, 1912, Serial No. 692,092. Divided and this application filed June 20, 1912. Serial No. 704,729.

*To all whom it may concern:*

Be it known that I, JOHN F. MCCANNA, a citizen of the United States, and a resident of Chicago, in the county of Cook and State of Illinois, have invented certain new and useful Improvements in Link-and-Lever Connections, of which the following is a full, clear and exact specification.

My invention is concerned with certain novel link and lever connections which I have designed more especially for use in operating force-feed lubricators from some reciprocating element, as shown in my patent 1,063,274, of which the present application is a division, but which connections may be employed for other purposes, as will be readily apparent.

To illustrate my invention, I annex hereto a sheet of drawings in which the same reference characters are used to designate identical parts in all the figures, of which—

Figure 1 is a side elevation of a portion of a lubricator having my novel link and lever connections applied thereto; Fig. 2 is a central sectional view through a portion of said connections; and Fig. 3 is a central sectional view through the remainder of said connections.

I have, for convenience, shown my invention as applied to the actuating rock shaft 10 of a force-feed lubricator, the bottom portion 11 of which is shown as supported on the foot or base 12. The rock shaft 10 is journaled in suitable bearings formed in the casing of the lubricator. A lever arm 13, which preferably takes the form of a rod having a threaded end, is secured at right angles to said shaft by the use of a T-connection 14, which is adapted to fit snugly on the shaft 10 and to be secured in place by screwing the rod 13 through the internally threaded arm until said rod engages and binds against the shaft 10. As these lubricating pumps are usually operated by reciprocating connections from the engine or other parts which they lubricate, it is desirable to have some form of connections that will operate perfectly even if the lubricator is not exactly adjusted with reference to the reciprocating member, and for this purpose I employ the novel connection shown, where it will be seen that the upper end of the operating rod or lever 13 carries a sleeve 14ª having a semispherical ball member 15 projecting from one side thereof. Coöperating with this ball member is a socket member 16, which has a semispherical recess or socket to receive the ball, and at the bottom of the socket is a flaring aperture 17 through which is passed the headed pin 18, the threaded end of which is screwed through the ball member 15 and against the operating rod 13 to secure the sleeve 14ª rigidly in the desired position upon the rod. To hold the ball and socket members yieldingly, yet firmly, together, I interpose the preferably helical and spirally coiled expanding spring 19 between the head of the pin 18 and the adjacent face of the socket member 16. This socket member 16 has the threaded recess 20, into which is screwed the connecting rod 21, the other end of which is screwed into a corresponding socket member 22 coöperating with a corresponding ball member 23, having a corresponding spring 24 and corresponding pin 25. In this case the ball member 23 has the pin 25 threaded entirely through it and adapted to be screwed into the reciprocating member 26 by which the pump or other member employing the rock shaft 10 is to be driven. With the construction thus described, it will be evident that this last-mentioned reciprocating member may be considerably out of alinement with the pump or other device to be operated, and still the ball and socket connections at the two ends of the connecting rod or link 21 will permit of the apparatus operating perfectly.

What I claim as new, and desire to secure by Letters Patent of the United States, is:

In a pitman connection, the combination with a socket member having an aperture at the bottom of the concavity, of a semispherical ball member coöperating therewith, a sleeve to which the ball member is attached, a rod passed through the sleeve, a headed pin extending through the aperture in the socket member and screwed through the ball member and sleeve until it engages the rod, and an expanding spring interposed between the socket member and the head of the pin.

In witness whereof, I have hereunto set my hand and affixed my seal, this 15th day of June, A. D. 1912.

JOHN F. McCANNA. [L. S.]

Witnesses:
JOHN HOWARD McELROY,
MILDRED ELSNER.

Copies of this patent may be obtained for five cents each, by addressing the "Commissioner of Patents, Washington, D. C."